United States Patent [19]
Self

[11] 3,921,668
[45] Nov. 25, 1975

[54] HIGH ENERGY LOSS ROLLED STRIP FLUID CONTROL DEVICE

[76] Inventor: Richard E. Self, 3221 Brimhall Drive, Los Alamitos, Calif. 90720

[22] Filed: Dec. 10, 1973

[21] Appl. No.: 423,314

[52] U.S. Cl. ............... 137/625.3; 251/127; 138/42
[51] Int. Cl.² ........................................ F16K 47/00
[58] Field of Search....... 137/625.3, 625.37, 625.39, 137/625.28; 251/127; 138/42

[56] References Cited
UNITED STATES PATENTS

| | | |
|---|---|---|
| 3,706,323 | 12/1972 | Hayner .......................... 137/625.3 |
| 3,722,854 | 3/1973 | Parola .............................. 251/127 |
| 3,813,079 | 5/1974 | Baumann et al. ................... 251/127 |

Primary Examiner—Henry T. Klinksiek
Attorney, Agent, or Firm—Hill, Gross, Simpson, Van Santen, Steadman, Chiara & Simpson

[57] ABSTRACT

A fluid control device, such as a valve, having a cage composed of a rolled perforated strip with the perforations so arranged as to provide elongated energy dissipating flow passageways with abrupt turns creating a drag and pressure drop on the fluid without generating noise. The strip is coiled around itself into a plurality of layers with communicating overlying perforations offset from each other so that streams of fluid passing through the cage must make a number of turns.

14 Claims, 9 Drawing Figures

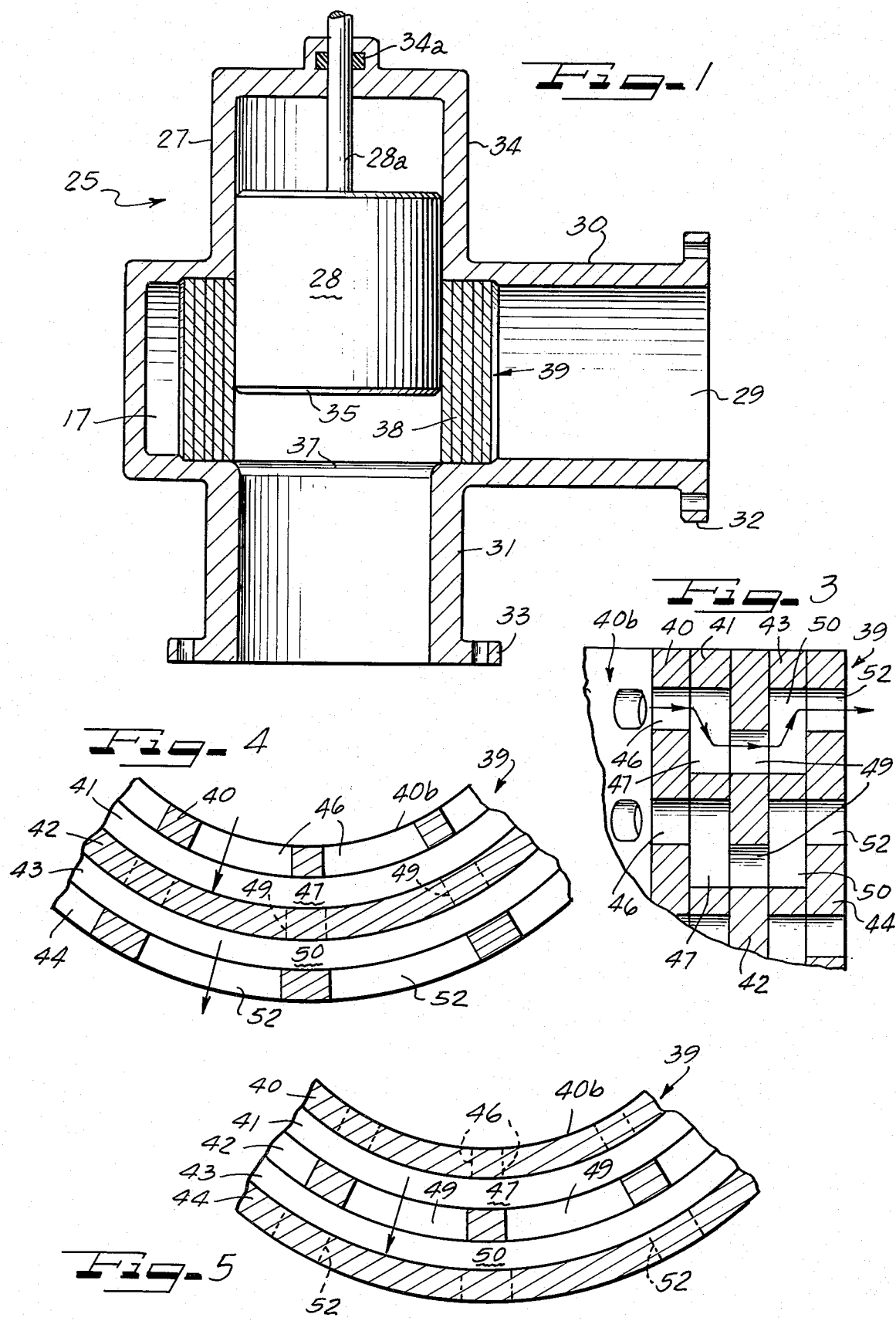

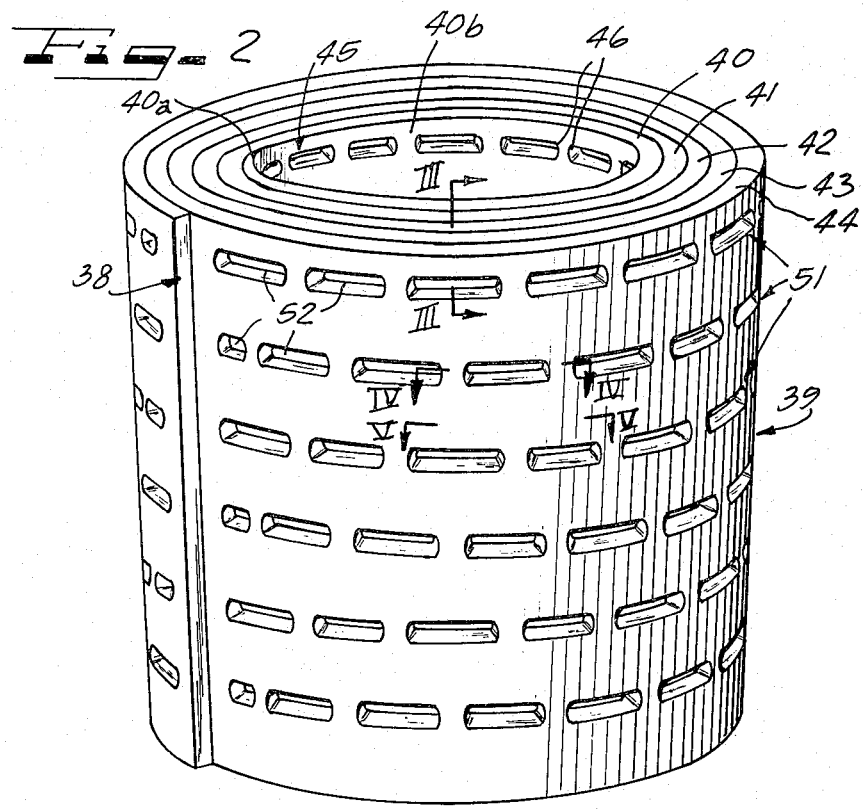
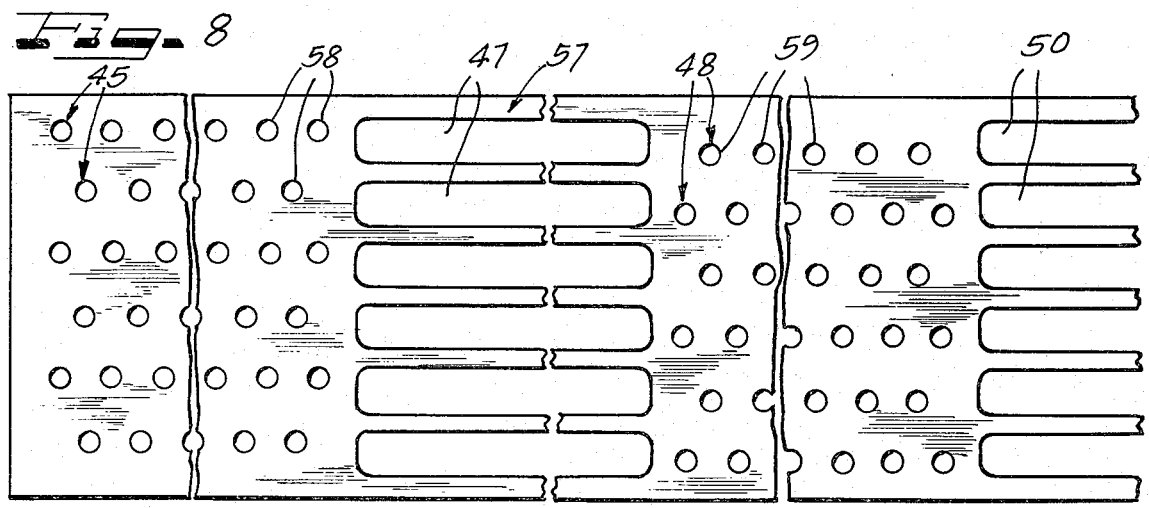
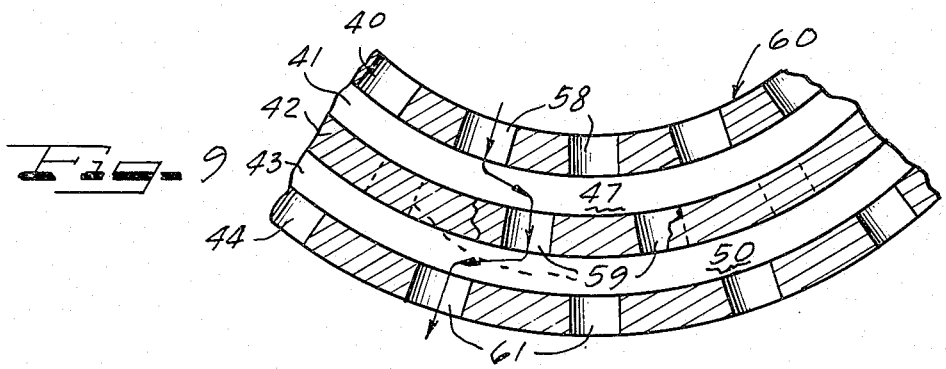

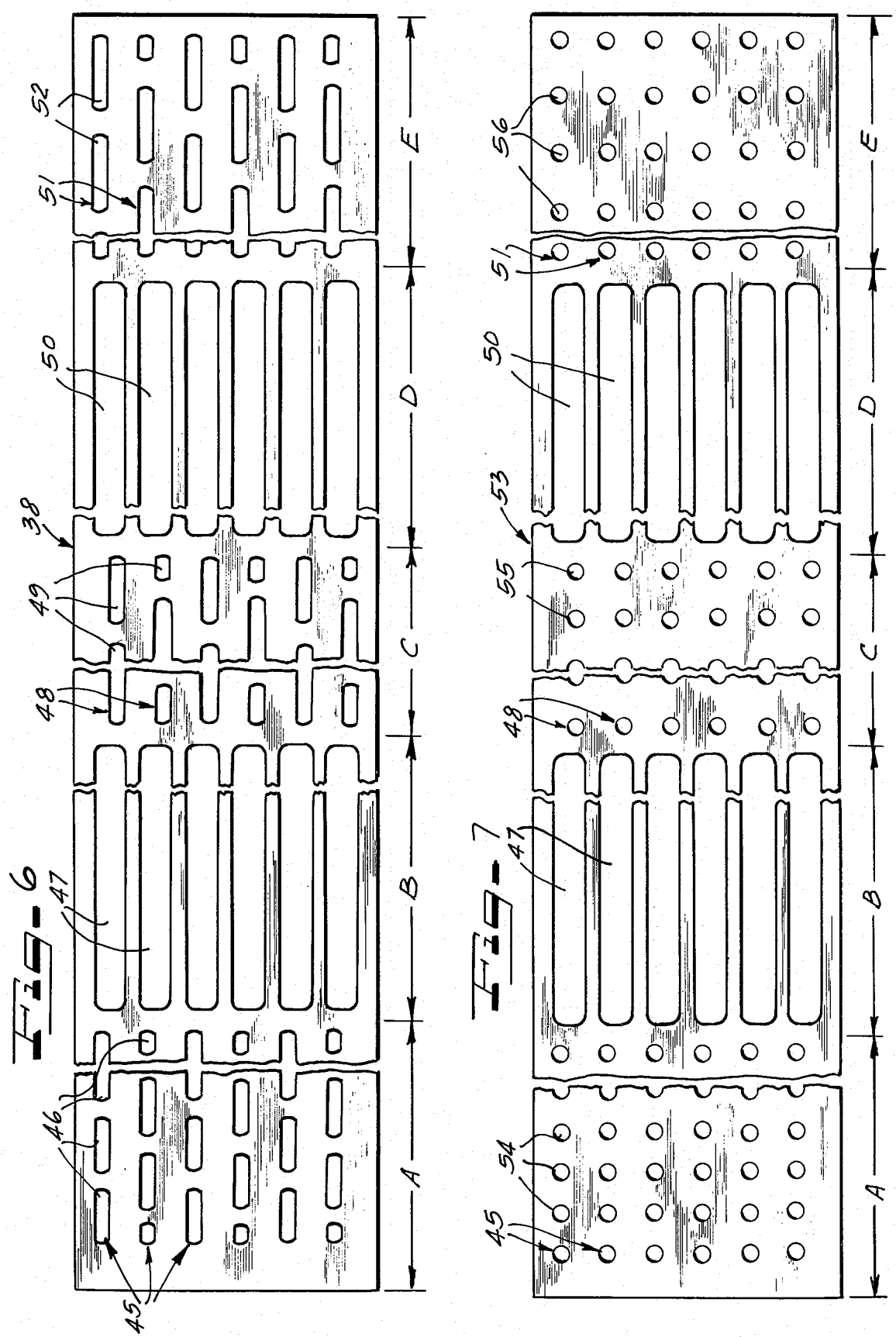

HIGH ENERGY LOSS ROLLED STRIP FLUID CONTROL DEVICE

BACKGROUND OF THE INVENTION

1. Field of the Invention

This invention relates to the art of relieving pressure in high pressure fluid flowing systems without generating noise or damaging equipment in the sytem and more particularly relates to an energy loss control device such as a valve with a cage receiving the fluid radially therethrough and composed of a coiled perforated metal strip with the perforations so arranged as to provide elongated passages with abrupt turns dividing the fluid into a plurality of streams and imparting high frictional resistance to flow for dissipating energy of the fluid.

2. Prior Art

In my prior U.S. Pat. No. 3,451,404 granted June 24, 1969; U.S. Pat. No. 3,515,964 granted May 26, 1970; and U.S. Pat. No. 3,514,074 granted May 26, 1970, the disclosures of which are incorporated herein by reference, these are described and claimed high energy loss fluid control devices subdividing and confining fluid in a plurality of streams, each extending through a substantial length of travel with a long length to diameter ratio to impart high frictional resistance losses to the fluid flow.

In the Gary D. Parola U.S. Pat. No. 3,722,854 granted Mar. 27, 1973 there is disclosed a valve with a perforated ribbon silencing element. This silencing element is formed by a coiled ribbon of perforated sheet metal with the perforations having dimensions across their openings always greater than the spacing between the openings so that openings in the adjacent layers of the coil will always overlap. Such arrangements of the perforations provide straight through passageways in the coil with minimal resistance to flow.

SUMMARY OF THIS INVENTION

This invention now provides a rolled or coiled perforated metal strip cage for high energy loss devices of the type disclosed and claimed in my aforesaid patents and eliminating the through passages of the aforesaid Parola U.S. Pat. No. 3,722,854. The rolled perforated strip cage of this invention has the perforations so programmed that no stream of fluid can pass through the cage without being subjected to a plurality of abrupt turns thereby maintaining the efficiency of the devices of my aforesaid patents with less expensive energy dissipating structure.

According to this invention, a strip or ribbon of metal is punched to form a plurality of longitudinal rows of spaced orifices which may be in the form of circular holes, ovals, slots, or the like. The rows of orifices extend longitudinally of the strip and are spaced transversely across the full width of the strip. Each row of orifices is followed by an elongated slot of at least twice the width as the transverse dimension of the orifices so to extend transversely beyond the adjacent row of orifices. These elongated slots are followed by rows of orifices identical with or similar to the rows of orifices preceding the slots but these succeeding rows of orifices are offset transversely from the preceding rows in alignment with the portions of the wide slots which extend transversely beyond the preceding rows of orifices. These offset rows of orifices are then followed by another set of rows of wide longitudinal slots aligned with the first set of wide slots. The punch pattern is repeated along the length of the strip.

The first set of rows of orifices have a length to extend circumferentially around the first layer or coil of the cage that is rolled up from the strip. The first set of wide slots have lengths to extend circumferentially around the first coil or layer and the succeeding rows of orifices and wide slots having correspondingly increasing lengths to extend circumferentially around the entire periphery of the layer or coil on which they are wound.

This programmed arrangement of orifices and wide slots provides a flow pattern radially through the cage composed of the rolled up or coiled strip requiring streams of fluid flowing through the cage to make abrupt turns thereby greatly increasing the frictional drag on the streams and increasing the efficiency of the cage to dissipate energy. Thus, when the strip is properly programmed rows of orifices and wide slots is tightly coiled to form the cage, the fluid can only enter and leave the wide slots at different levels causing the fluid to turn as it flows from one layer to the next layer of the coil. Further, the orifices in successive rows can be longitudinally offset thus creating additional turns for the streams of fluid.

It is then an object of this invention to provide a high energy loss control device with a rolled or coiled perforated strip cage dividing fluid into a plurality of elongated streams which must make abrupt turns as they pass through the cage dissipating energy from the fluid.

Another object of this invention is to provide a simplified, inexpensive rolled metal strip cage with programmed punchings defining energy absorbing passages for high energy loss fluid control devices of the typed covered by my U.S. Pat. Nos. 3,451,404; 3,513,864; and 3,514,070.

A further object of the invention is to improve coiled strip cages for energy dissipating valves to eliminate heretofore required straight through flow passages.

Another object of this invention is to provide cages for high energy loss fluid control devices from metal strip material having programmed punch patterns defining energy dissipating flow paths creating abrupt turns in streams of fluid flowing through the cage.

A specific object of the invention is to provide a rolled strip punched metal cage of reducing pressure of fluid without generating noise wherein the punchings are programmed to define a myriad of efficient pressure drop creating flow passages.

Other and further objects of this invention will be apparent to those skilled in this art from the following detailed description of the annexed sheets of drawings which by way of preferred examples only illustrate several embodiments of the invention.

ON THE DRAWINGS

FIG. 1 is a longitudinal sectional view through a high energy loss fluid control device of this invention illustrated in the form of a plug valve;

FIG. 2 is a perspective view of a rolled strip cage for the valve of FIG. 1;

FIG. 3 is a fragmentary vertical cross sectional view along the line III—III of FIG. 2;

FIG. 4 is a fragmentary horizontal cross sectional view along the line IV—IV of FIG. 2;

FIG. 5 is a fragmentary horizontal sectional view along the line V—V of FIG. 2;

FIG. 6 is a broken plan view of a punched metal strip forming the cage of FIGS. 2 to 5;

FIG. 7 is a view similar to FIG. 6 but illustrating another punch pattern for the strip;

FIG. 8 is a view similar to FIGS. 6 and 7 but illustrating still another punch pattern; and FIG. 9 is a fragmentary horizontal section similar to FIG. 4 but taken through a cage rolled up or coiled from the strip of FIG. 8.

AS SHOWN ON THE DRAWINGS

In FIG. 1, a control valve assembly 25 incorporating a cage of this invention includes a valve housing 27 within which a valve plug 28 is mounted in controlling relation to a passage 29 which extends through angularly related portions 30 and 31 having respective flanges 32 and 33 at their open ends by which the housing is adapted to be secured in fluid tight communication with other members serving as continuations of the passage 29 in a flow system. For controlling the passage 29, the valve plug 28 is reciprocably mounted in the housing section 31 which has a head extension 34 within which the plug is slidably received in the fully open condition of the valve and from which the plug is projectable into throttling relation across the passage 29 to effect incremental closing between a fully open and a fully closed position wherein an annular valve shoulder 35 seats on a complementary valve seat 37 defining the junction of the body sections 30 and 31 and about which is an encompassing chamber 17. Reciprocal movements of the valve plug 28 are adapted to be effected through a valve stem 28a extending through a packing gland 34a in the end head of the head chamber 34.

To attain energy losses in the flowing medium in the passage 29, without damaging velocities and abrupt pressure drop, all fluid passing the plug 29 is subdivided into a plurality of individual streams of respective small cross sectional flow area and substantial length to impose frictional resistance energy loss on the flowing fluid medium. In the present invention a punched metal strip 38 is rolled or coiled on itself to provide a cage 39 surrounding the valve plug 28 and providing a continuation of the plug guiding surface afforded by the housing head 34 concentric with the housing portion 31 and extending across that part of the passage 29 in the housing portion 30. As shown in FIG. 2, the rolled strip 38 has five coils or layers 40, 41, 42, 43, and 44. The inner layer or coil 40 has its end 40a tapered to merge smoothly into the next layer or coil 41 and define a cylindrical bore 40b through the center of the cage smoothly receiving and guiding the plug 28.

As shown in FIG. 6, the strip 38 from which the cage 39 of FIG. 2 is formed, is an elongated strip or ribbon of metal such as stainless steel, brass, or the like with a programmed pattern of punched out portions defining orifices and slots. In FIG. 6, the strip 38 has a plurality of longitudinal rows 45 of longitudinally spaced orifices 46 in the form of narrow longitudinally extending slots. Six rows 45, of orifices 46, are illustrated in conformity with the showing of FIG. 2 and these rows traverse the entire width of the strip or ribbon 38. The number of rows, of course, can be varied as desired. The length of each row is programmed to provide enough orifices 46 for surrounding each coil or layer of the cage to be rolled up from the strip and as shown, some of the slot orifices 46 are shortened to provide rows of the desired length.

Each row of orifices 46 is followed by a wide longitudinally elongated slot 47 having about twice the width of the orifices 46 in the preceding row 45. The slots 47 are oriented relative to the rows 45 so that their top portions, as viewed in FIG. 6, are aligned with the rows while their bottom portions project below the rows. The slots 47 have lengths sufficient to encompass a complete coil layer surrounding the inner coil containing the orifices 46.

The slots 47 are followed by longitudinal rows 48 of longitudinally spaced orifices 49 in the form of narrow elongated slots. These rows 48 are offset transversely from the rows 46 and are aligned with the bottom halves of the preceding wide slots 47. The rows 48 are long enough so that the orifices 49 will encompass the slots 47 in the underlying layer of the coil to be formed from the strip.

The rows 48 of orifices 49 are followed by a second set of wide longitudinally elongated slots 50 positioned so that their lower portions will register with the orifices 49. These slots 50 are long enough to encompass the rows 48 of orifices 49 when the strip is rolled into a coil. Next, the wide long slots 50 are followed by rows 51 of orifices 52 in the form of narrow longitudinally elongated slots and the rows 52 are positioned to register with the top halves of the slots 50 and are long enough to encompass these slots when the strip is coiled.

The portion A of the strip will form the inner coil or layer 40 of the cage 49 with the portions designated B, C, D, and E of the strip respectively forming the layers or coils 41, 42, 43, and 44 of the cage.

FIG. 7 shows a strip 53 with a modified punch pattern. In FIG. 7 the orifices 54, 55, and 56 are in the form of circular holes replacing the elongated narrow slots 46, 49, and 52 of the strip 38 but the same row alignment with the wide slots is used and the rows and slots have been designated with the same reference numerals used in FIG. 6.

In FIG. 8 the strip 57 has a punch pattern similar to the strip 53 with the exception that the orifices 58 and 59 are reversely staggered in the successive rows 45 and 48 so that the orifices 58 in the rows 45 are longitudinally offset from the orifices 59 in the rows 48. This reverse staggering of orifices 58 and 59 in successive rows 45 and 48 creates circumferential as well as axial turns in the streams of fluid flowing through the cage.

As shown in FIG. 3, fluid flowing radially outward from the center bore 40b of the cage 39 must follow tortuous paths with two abrupt turns. Thus, fluid from the bore 40b is divided into streams upon entering the orifices 46 of the inner coil 40. From these orifices the streams flow into the top portions of the slots 47 in the surrounding layer 41. The orifices 49 in the layer 42 surrounding the slots 47 communicate with the bottom portions of the slots and so the fluid must make an abrupt turn to flow from the orifices 46 through the annular channels provided by the slots 47 to reach the orifices 49. Fluid discharging from the orifices 49 flows through the annular channels provided by the slots 50 in the coil layer 43 and must again make an abrupt turn to reach the orifices 52 in the outer coil 44. The successive layers of the coil are tightly wrapped on each other and no straight through flow path is provided.

As shown in FIG. 4, at the tier or level of the section line IV—IV of FIG. 2, the fluid flows from the bore 40b of the cage 39 radially outward through the orifices 46 to enter the annular channel provided by the slot 47 but the wall of the coil layer 42 lying opposite the orifices 46 forms a barrier diverting the flow downwardly to the orifices 49 from which they can enter the annular channel provided by the slot 50 where the wall of the outer layer 44 will divert the flow upwardly to the exit orifices 52.

Conversely, at the level along the section line V—V of the cage 39 in FIG. 2, as shown in FIG. 5, the orifices 46, 49 and 52 are shown as out of phase with the showing of FIG. 4 to emphasize the up and down tortuous passage that each stream of fluid must traverse as it flows through the cage 39. These figures also show that the annular channels provided by the slots 47 and 50 have larger volumes than the orifices which feed these channels. This permits an expansion of the fluid but the expansion is not sufficient to permit cavitation or flashing. The expansion does have some effect in dissipating energy from the fluid so that it will emerge at a lower pressure than exists when it enters the cage.

Circumferential flow is created in the channels provided by the slots 46 and 50 by the staggered orifice pattern of the strip 57 of FIG. 8. As shown in FIG. 9 where this strip 57 is coiled to form a cage 60, the fluid exiting from the orifices 58 must flow circumferentially in the channel provided by the slot 47 to reach the orifices 59. Fluid exiting from the orifices 59 must flow circumferentially through the channel provided by the slot 50 to reach the exit orifices 61. Thus, circumferential as well as axial turns are provided in the flow passages for the streams of fluid flowing through the cage.

It will be appreciated that the punch patterns can be varied considerably from those described and illustrated herein to produce rolled strip or coiled cages with passages dividing the fluid flowing through the device into a myriad of small streams which must make abrupt turns in passing radially through the cage. The punch patterns are so arranged that no path extends directly between the interior and exterior of the cage, and no path communicates with an adjacent axial path in the cage. These paths or passages never accommodate straight flow of the streams and effectively dissipate energy from the fluid without generating noise. The coils or layers of the cage are wound tightly on each other to prevent leakage therebetween. If desired, the coils can be brazed or soldered together to stop leakage.

I claim as my invention:

1. In an energy loss fluid control device adapted for installation in a fluid transfer system to create a frictional drag and pressure drop on the fluid for dissipating potential energy of the fluid without developing noise, the improvement which comprises a cage receiving the fluid radially therethrough composed of a tubular coiled punch strip with a plurality of tightly wrapped overlying layers with the punchings of an underlying layer registering with the punchings of an overlying layer and arranged relative to each other in the successive layers to provide a myriad of axially separated flow paths connecting the inner and outer peripheries of the tubular coil and with the punchings in adjacent layers arranged so that each flow path has abrupt turns whereby fluid passing through the cage is divided into a myriad of small streams and each stream must traverse a flow path with abrupt turns before it can exit from the cage, whereby no path extends directly between the interior and exterior of the cage, and no path communicates with an adjacent axial path.

2. The device of claim 1 where the punchings are arranged to form axially spaced longitudinal rows of longitudinally spaced orifices alternating with elongated slots and with the longitudinally successive rows of orifices being offset to register with the intervening slots in axially displaced relation.

3. The device of claim 1 wherein the punchings of the strip form alternating rows of orifices and slots arranged in axially and longitudinally offset relationship to cooperate with the slots in forming flow passages with axial and circumferential turns.

4. The device of claim 1 wherein the coiled punch strip has at least five layers in tight overlying relationship.

5. A cage for an energy loss fluid flow control device which comprises a tubular coiled metal strip having a plurality of tightly wrapped overlying layers punched to provide a plurality of axially separated alternating orifices and circumferentially elongated wide channels communicating with the orifices in adjacent layers only in off-set relation to cause fluid flowing through the cage to be sub-divided into a myriad of streams each of which has abrupt turns for dissipating energy from the fluid, whereby no path extends directly between the interior and exterior of the cage and no path communicates with an adjacent axial path.

6. The cage of claim 5 wherein the orifices are arranged in circumferential rings in axially spaced relationship with the wide channels between the orifices having their top portions aligned with an underlying ring and their bottom portions aligned with an overlying ring.

7. The cage of claim 5 wherein the channels are at least twice as wide as the orifices.

8. The cage of claim 5 wherein the orifices are elongated slots.

9. The cage of claim 5 wherein the orifices are circular holes.

10. The cage of claim 5 wherein the coiled strip has at least five layers.

11. An energy loss silent valve which comprises a casing defining a fluid flow passage, a valve plug controlling flow through said passage, a cage surrounding said plug, said cage being a tubular coiled punched metal strip with a plurality of layers in tightly wrapped relation, the inner layer of said coiled strip having rings of circumferentially spaced orifices in axially spaced relation adapted to be covered and uncovered by said plug, the layer of said coiled strip surrounding said inner layer having circumferential slots with axial top portions aligned with the orifices in the inner layer, said coiled strip having a third layer surrounding the second layer with rings of circumferentially spaced orifices in axially spaced relation aligned with the axial bottom portions of the slots in the second layer, said coiled strip having a fourth layer surrounding the third layer with circumferential slots having axial bottom portions aligned with the rings of orifices in the third layer and axial top portions offset from said orifices, and said cage having a fifth layer overlying the fourth layer with rings of circumferentially spaced orifices in axially spaced relation aligned with the axial top portions of the slots in the fourth layer whereby the cage divides fluid flowing therethrough into a plurality of axially separated streams which must make abrupt turns in flowing through the cage, whereby no path extends directly between the interior and exterior of the cage, and no path communicates with an adjacent axial path.

12. The valve of claim 11 wherein the slots in the cage are at least twice as wide as the orifices.

13. The valve of claim 11 wherein the orifices are circular holes.

14. The valve of claim 11 wherein the orifices in the cage are circumferentially elongated slots.

* * * * *